US007707077B2

(12) United States Patent  (10) Patent No.: US 7,707,077 B2
Müller et al.  (45) Date of Patent: Apr. 27, 2010

(54) ELECTRONIC FINANCIAL TRANSACTION WITH BALANCING INVOICE AND CREDIT ITEMS VIA PAGE

(75) Inventors: Thomas Müller, Wiesloch (DE); Jürgen Köhling, Hockenheim (DE)

(73) Assignee: SAP AG, Walldorf (DE)

( * ) Notice: Subject to any disclaimer, the term of this patent is extended or adjusted under 35 U.S.C. 154(b) by 1536 days.

(21) Appl. No.: 10/400,582

(22) Filed: Mar. 28, 2003

(65) Prior Publication Data

US 2004/0167836 A1 Aug. 26, 2004

(30) Foreign Application Priority Data

Mar. 28, 2002  (EP)  .................................  02007112

(51) Int. Cl.
*G07B 17/00* (2006.01)
(52) U.S. Cl. ............................. 705/30; 705/34; 705/64
(58) Field of Classification Search .................... 705/30
See application file for complete search history.

(56) References Cited

U.S. PATENT DOCUMENTS

| 5,956,709 | A | 9/1999 | Xue |
| 5,963,925 | A | 10/1999 | Kolling et al. |
| 6,175,823 | B1 | 1/2001 | Van Dusen |
| 6,324,525 | B1 | 11/2001 | Kramer et al. |
| 6,336,098 | B1 | 1/2002 | Fortenberry et al. |
| 6,996,542 | B1 * | 2/2006 | Landry .......................... 705/40 |
| 7,137,551 | B1 * | 11/2006 | Crews et al. ................. 235/379 |
| 2001/0044776 | A1 * | 11/2001 | Kight et al. .................... 705/40 |
| 2002/0019808 | A1 | 2/2002 | Sharma |
| 2002/0019809 | A1 * | 2/2002 | Kitchen et al. ................. 705/40 |
| 2002/0082990 | A1 | 6/2002 | Jones |
| 2002/0143701 | A1 | 10/2002 | Maguire et al. |
| 2003/0093373 | A1 * | 5/2003 | Smirnoff et al. ............... 705/40 |
| 2003/0167229 | A1 | 9/2003 | Ludwig et al. |
| 2003/0217013 | A1 | 11/2003 | Muller et al. |

(Continued)

FOREIGN PATENT DOCUMENTS

EP  0 745 947 A2  12/1996

(Continued)

OTHER PUBLICATIONS

Office Action, USPTO, Application No. 10/400,579, mailed Oct. 18, 2005. (9 pgs.).

(Continued)

*Primary Examiner*—Vanel Frenel
(74) *Attorney, Agent, or Firm*—Finnegan, Henderson, Farabow, Garrett & Dunner LLP

(57) ABSTRACT

An electronic transaction, in which a payment amount is deducted from a customer account and added to a provider account, is prepared in cooperation between an account computer and a browser-enabled customer computer. The account computer forwards invoice and credit information as well as calculation instructions in portions of a page to the customer computer. The customer computer interprets a first page portion with a browser to present different invoice items and credit items on a screen. A user selection of the invoice and credit items is received and then the payment amount is calculated by offsetting the amounts of the invoice and credit items with instructions in a second page portion. Thereafter, a response with the payment amount is returned to the account computer.

20 Claims, 23 Drawing Sheets

U.S. PATENT DOCUMENTS

| | | | |
|---|---|---|---|
| 2004/0148234 A1 | 7/2004 | Gonen-Friedman et al. | |
| 2004/0215572 A1 | 10/2004 | Uehara et al. | |
| 2005/0027654 A1* | 2/2005 | Adrian | 705/40 |
| 2005/0033690 A1 | 2/2005 | Antognini et al. | |
| 2005/0108153 A1* | 5/2005 | Thomas et al. | 705/39 |

FOREIGN PATENT DOCUMENTS

| | | |
|---|---|---|
| WO | WO 97/16798 | 5/1997 |
| WO | WO 01/41020 A1 | 6/2001 |
| WO | WO 01/82162 A1 | 11/2001 |

OTHER PUBLICATIONS

Office Action, USPTO, Application No. 10/400,579, mailed Apr. 6, 2006. (11 pgs.).

Advisory Action, USPTO, Application No. 10/400,579, mailed Jul. 28, 2006. (2 pgs.).

Notice of Panel Decision from Pre-Appeal Brief Review, USPTO, Application No. 10/400,579, mailed Sep. 22, 2006. (2 pgs.).

Board of Patent Appeals and Interferences Decision, USPTO, Application No. 10/400,579, mailed Jun. 19, 2008. (17 pgs.).

Office Action, USPTO, Application No. 10/400,579, mailed Sep. 2, 2008. (11 pgs.).

Advisory Action, USPTO, Application No. 10/400,579, mailed Nov. 4, 2008. (3 pgs.).

Office Action, USPTO, Application No. 10/400,579, mailed Feb. 11, 2009. (16 pgs.).

Office Action, USPTO, Application No. 10/400,579, mailed Aug. 13, 2009. (12 pgs.).

EP Application No. 02003545.7 (Client Ref. No. 2002-012-EP), filed Feb. 15, 2002, pp. 1-17 and Figures 1-8.

* cited by examiner

|   | I | C | P |
|---|---|---|---|
| E | EI | EC | EP |
| M | MI | MC | MP |
| D | DI | DC | DP |
|   | I(m) | C(n) | P(q) |
| Σ | $\Sigma I = \Sigma I(m)$<br>m=1 to M | $\Sigma C = \Sigma C(n)$<br>n=1 to N | $\Sigma P = \Sigma P(q)$<br>q=1 to Q |
| E | $E^O I, E^R I$ | $E^O C, E^R C$ |   |

FIG. 6

| I(m) | | P(q) | | C(m) | |
|---|---|---|---|---|---|
| I(1) | = 20 € | P(1) | = -10 € | C(1) | = 30 € |
| I(2) | = 10 € | P(2) | = 0 € | C(2) | = 10 € |
| I(3) | = 40 € | P(3) | = 20 € | C(3) | = 20 € |
| I(4) | = 30 € | P(4) | = 10 € | C(4) | = 20 € |
| ΣI | = 100€ | ΣP | = 20 € | ΣC | = 80 € |

FIG. 8

EIL

|  | INVOICE | AMOUNT |
|---|---|---|
| ☐ | Jan | 200 € |
| ☐ | Feb | 100 € |
|  | Total to Pay | 300 € |

$E^Ol(Jan)_3$  200
$E^Ol(Feb)_3$

MIL

|  | INVOICE | AMOUNT |
|---|---|---|
| ☑ | Jan | 130 € |
| ☑ | Feb | 90 € |
|  | Decided | 220 € |

$MI(Jan)_3$  250
$MI(Feb)_3$

BL

|  | BANK | AMOUNT |
|---|---|---|
| ⊙ | X | 220 € |
| ○ | Y |  |

X  250

MARCH

FIG. 12

EIL

| | INVOICE | AMOUNT |
|---|---|---|
| ☐ | Jan | 70 € |
| ☐ | Feb | 10 € |
| ☐ | Mar | 80 € |
| | Total to pay | 160 € |

$E^R I(Jan)_4$   200
$E^R I(Feb)_4$
$E^O I(Mar)_4$

MIL

| | INVOICE | AMOUNT |
|---|---|---|
| ☑ | Jan | 70 € |
| ☑ | Feb | 10 € |
| ☑ | Mar | 70 € |
| | Decided | 150 € |

$MI(Jan)_4$   250
$MI(Feb)_4$
$MI(Mar)_4$

BL

| | BANK | AMOUNT |
|---|---|---|
| ○ | X | |
| ⊙ | Y | 150 € |

Y   250

APRIL

FIG. 13

EIL

| INVOICE | AMOUNT |
|---|---|
| ☐ Mar | 10 € |
| ☐ Apr | 50 € |
| Total to pay | 60 € |

$E^R I(Mar)_5$   200
$E^O I(Apr)_5$

MIL

| INVOICE | AMOUNT |
|---|---|
| ☑ Mar | 10 € |
| ☑ Apr | 90 € |
| Decided | 100 € |

$MI(Mar)_5$   250
$MI(Apr)_5$

BL

| BANK | AMOUNT |
|---|---|
| ⊙ X |  |
| ○ Y | 100 € |

X   250

MAY

FIG. 14

EIL / ECL

| | INVOICE | AMOUNT |
|---|---|---|
| ☐ | May | 50 € |
| | CREDIT | |
| ☐ | April | 40 € |
| | Total to pay | 10 € |

$E^oI(May)_6$  200

$E^oC(Apr)_6$

MIL / MCL

| | INVOICE | AMOUNT |
|---|---|---|
| ☑ | May | 40 € |
| | CREDIT | |
| ☑ | Apr | 10 € |
| | Decided | 30 € |

$MI(May)_6$  250

$MC(Apr)_6$

BL

| | BANK | AMOUNT |
|---|---|---|
| ⊙ | X | 30 € |
| ○ | Y | |

X  250

JUNE

FIG. 15

EIL / ECL

| INVOICE | | AMOUNT | |
|---|---|---|---|
| ☐ | May | 10 | € |
| ☐ | Jun | 40 | € |
| | CREDIT | | |
| ☐ | Apr | 30 | € |
| | Total to pay | 20 | € |

$E^R I(May)_7$  200
$E^O I(Jun)_7$ $E^R C(Apr)_7$

MIL / MCL

| INVOICE | | AMOUNT | |
|---|---|---|---|
| ☑ | May | 10 | € |
| ☑ | Jun | 20 | € |
| | CREDIT | | |
| ☑ | April | 30 | € |
| | Decided | 0 | € |

$MI(May)_7$  250
$MI(Jun)_7$ $MC(Apr)_7$

JULY

FIG. 16

| OPEN INVOICES | PAID INVOICES | USED CREDITS | OPEN CREDITS | PAYMENTS PER ITEM | PAYMENTS PER DATE |
|---|---|---|---|---|---|
| | | | | | |

LIST SELECTOR

AUGUST

OIL

| OPEN INVOICES | AMOUNT |
|---|---|
| Jun | 20 € |
| | |

$E^R{}_I(Jun)_8$ : 300

AUGUST

| USED CREDITS | | | |
|---|---|---|---|
| CREDIT TO | AMOUNT | USED FOR | AMOUNT IN |
| Apr | 40 € | May | 10 € | JUNE |
| | | May | 10 € | JULY |
| | | Jun | 20 € | JULY |

300

AUGUST

FIG. 20

| CL | | |
|---|---|---|
| OPEN CREDITS | AMOUNT | USABLE FOR |
| CREDIT TO | 0 € | |
| AUGUST | | |

| ITEMS | PAID | PAY DATE | BANK | PAYMENTS PER ITEM | |
|---|---|---|---|---|---|
| | | | | AMOUNT | |
| Jan | YES | MARCH | X | 130 € | |
| | | APRIL | Y | 70 € | |
| Feb | YES | MARCH | X | 90 € | |
| | | APRIL | Y | 10 € | |
| Mar | YES | APRIL | Y | 70 € | |
| | | MAY | X | 10 € | |
| Apr | YES | MAY | X | 50 € | |
| | | | | 40 € to CREDIT | |
| May | YES | JUNE | X | 40 € | |
| | | | CREDIT | 10 € | |
| | | JULY | CREDIT | 10 € | |
| Jun | NO | JULY | CREDIT | 20 € | |

AUGUST

300

$MI(Jan)_3$
$MI(Jan)_4$ $MI(Feb)_3$
$MI(Feb)_4$ $MI(Mar)_4$
$MI(Mar)_5$ $MI(Apr)_5$
$E^o(Apr)_5 - MI(Apr)_5$ $MI(May)_6$ $MI(Jun)_7$

FIG. 22

| PAY DATE | ITEMS | BANK | AMOUNT | PAYMENTS PER DATE SUM |
|---|---|---|---|---|
| MARCH | Jan | X | 130 € | 220 € |
| | Feb | | 90 € | |
| APRIL | Jan | Y | 70 € | 150 € |
| | Feb | | 10 € | |
| | Mar | | 70 € | |
| MAY | Mar | X | 10 € | 100 € |
| | Apr | | 50 € | |
| | Apr CRED | | 40 € | |
| JUNE | May | X | 40 € | 50 € |
| | | CRED | 10 € | |
| JULY | May | CRED | 10 € | 30 € |
| | Jun | | 20 € | |
| AUGUST | | | | |

300

MI(Jan)₃
MI(Feb)₃

MI(Jan)₄
MI(Feb)₄
MI(Mar)₄

MI(Mar)₅
MI(Apr)₅
E°(Apr)₅ - MI(Apr)₅

MI(May)₆

MI(Jun)₇

ELECTRONIC FINANCIAL TRANSACTION WITH BALANCING INVOICE AND CREDIT ITEMS VIA PAGE

FIELD OF THE INVENTION

The present invention generally relates to the field of data processing and, more particularly, the invention relates to computer systems, computer programs, and methods that support financial transactions via browser pages.

BACKGROUND OF THE INVENTION

Service providers (e.g., private companies or governmental organizations) utilize computer systems to perform routine tasks, such as billing/payment processes. Self-service scenarios can be convenient and provide cost savings not only for the provider, but also for the customer. For example, a customer can review invoice or bank accounts that are presented by a browser interpreting a page.

The following documents are useful:
U.S. Pat. No. 6,175,823,
U.S. Pat. No. 6,336,098, and
U.S. Pat. No. 6,324,525.

For invoices with multiple items that either charge or deduct to/from the customer's bank account, there is a technical task to calculate balances and to communicate items to/from the customer with minimum load to the network.

SUMMARY OF THE INVENTION

In accordance with embodiments of the present invention, a method is provided for preparing an electronic financial transaction, wherein prior to preparing the transaction, a first computer of a provider forwards invoice and credit information to a second computer of an account institution, and wherein after preparing, the second computer performs the transaction by deducting a payment amount from a customer account and adding the payment amount to a provider account.

In the method, the step of preparing may comprise:

sending a page to a third computer to forward invoice and credit information in a first portion of the page and to forward calculation instructions in a second portion of the page;

interpreting the first portion by a browser of the third computer to present different invoice items and credit items on a screen;

receiving from a user of the third computer a selection of at least one invoice item and of at least one credit item;

calculating the payment amount by offsetting the amounts of the invoice and credit items, thereby using the instructions in the second portion; and returning a response with the payment amount to the second computer.

In the step of calculating, the payment amount may be evaluated under consideration of an available date of credit items. Further, in the sending step, the first portion and the second portion of the page may be provided in a markup language. The second portion may comprise client/browser interpretable language. In one embodiment, the language comprises JavaScript code.

In accordance with embodiments of the invention, receiving the selection may comprise receiving a modification of at least one item selected from the group of an invoice item and a credit item. Further, calculating the payment amount may comprise offsetting modified amounts. Additionally, or alternatively, receiving the selection may comprise receiving an invoice-to-credit-assignment. Moreover, returning the response may comprise returning an assignment vector, and receiving the selection may comprise receiving a selection of a payment instrument. Further, the step of calculating may comprise calculating credit as the difference between a modified invoice amount and an entry invoice amount, wherein the credit is communicated in a page during further execution of the method.

Embodiments of the present invention also relate to a computer program product with computer instructions for causing one or more computer processors to execute the methods of the invention.

In accordance with still other embodiments of the invention, a computer system is provided for preparing an electronic financial transaction. The system comprises a first computer of a provider, a second computer of an account institution, and a third computer of a customer operated by a user. In the system, the first computer forwards invoice and credit information to the second computer prior to the preparation of the transaction and, after the preparation of the transaction, the second computer performs the transaction by deducting a payment amount from a customer account and adding the payment amount to a provider account.

The system may include various computer-implemented means. For example, the second computer may comprise means for sending a page to the third computer to forward invoice and credit information in a first portion of the page and to forward calculation instructions in a second portion of the page. Further, the third computer may comprise means for interpreting the first portion with a browser to present different invoice items and credit items on a screen. Additionally, or alternatively, the third computer may comprise means for receiving from a user of the third computer a selection of at least one invoice item and of at least one credit item. The third computer may also comprise means for calculating the payment amount by offsetting the amounts of the invoice and credit items according to the instructions in the second portion, and means for returning a response with the payment amount to the second computer.

BRIEF DESCRIPTION OF THE DRAWINGS

FIG. 6 illustrates a classification of monetary amounts;

FIG. 8 illustrates an exemplary overview of an assignment feature;

FIGS. 12-16 illustrate exemplary screens during execution of the first method at consecutive time points; and FIGS. 17-23 illustrate exemplary screens during execution of the second method.

COMPUTER SYSTEM IN GENERAL

Figure 1:
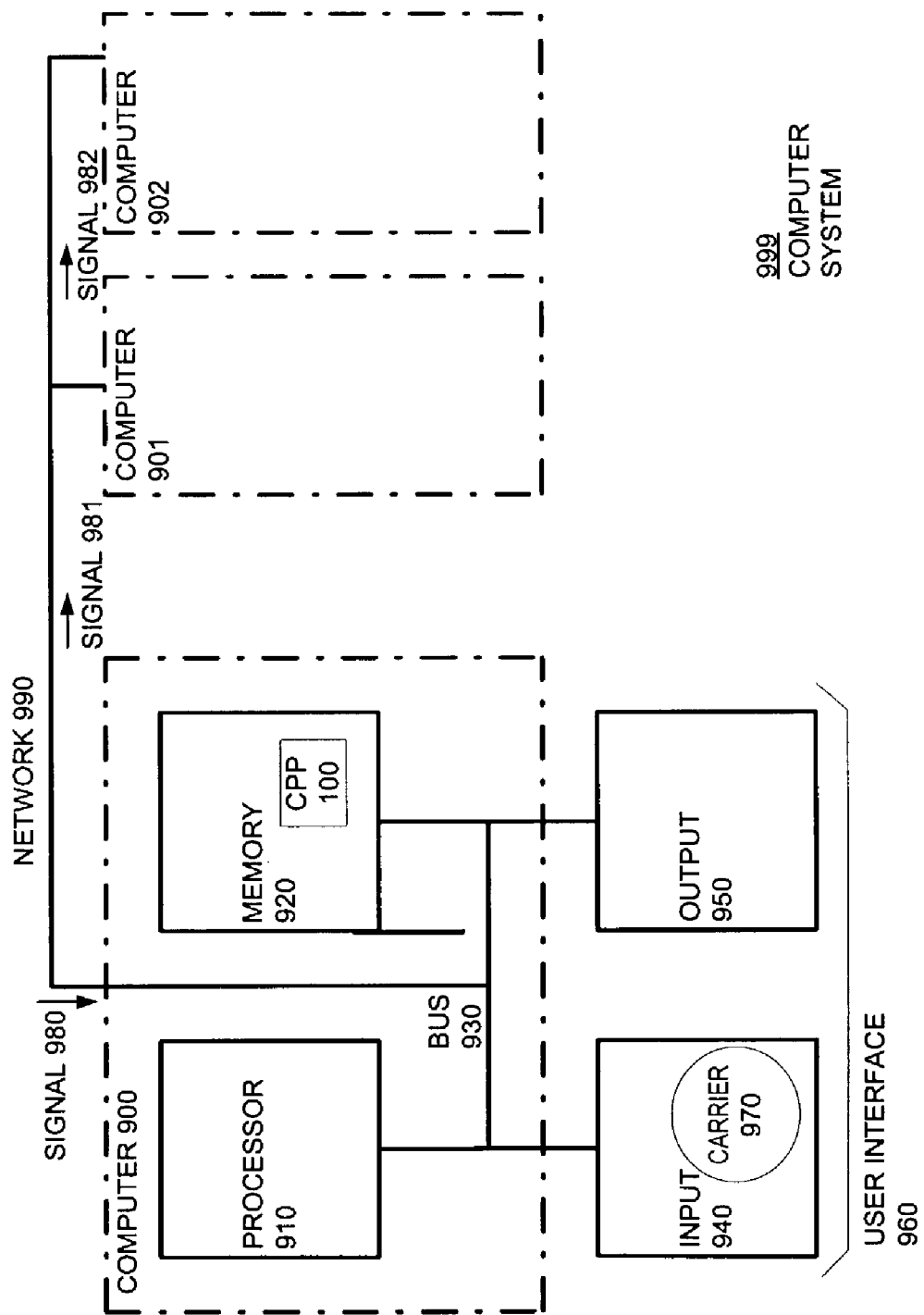
FIG. 1 illustrates a simplified block diagram of an inventive computer network system.

FIG. 1 illustrates a simplified block diagram of an inventive computer network system 999 comprising a plurality of computers 900, 901, 902 (or 90*q*, with q=0 . . . Q–1, Q any number).

Computers 900-902 are coupled via an inter-computer network 990. Computer 900 comprises a processor 910, a memory 920, a bus 930, and, optionally, an input device 940 and an output device 950 (I/O devices or user interface 960). As illustrated, embodiments of the invention may be implemented by a computer program product 100 (CPP), a program carrier 970 and/or a program signal 980, collectively "program".

With respect to computer 900, computer 901/902 is sometimes referred to as "remote computer." Computer 901/902 is, for example, a server, a router, a peer device or other common network node, and typically comprises many or all of the elements described relative to computer 900. Hence, elements 100 and 910-980 in computer 900 collectively illustrate also corresponding elements 10*q* and 91*q*-98*q* (shown for q=0) in computers 90*q*.

Computer 900 is, for example, a conventional personal computer (PC), a desktop, a laptop, a hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), a digital signal processor (DSP), or the like.

Memory 920 symbolizes elements that temporarily or permanently store data and instructions. Although memory 920 is conveniently illustrated as part of computer 900, memory functions can also be implemented in network 990, in computers 901/902 and in processor 910 itself (e.g., a cache or register), or elsewhere. Memory 920 can be a read only memory (ROM), a random access memory (RAM), or a memory with other access options. Memory 920 may be physically implemented by computer-readable media, such as, for example: (a) magnetic media, like a hard disk, a floppy disk, or other magnetic disk, a tape, a cassette tape; (b) optical media, like an optical disk (e.g., a CD-ROM or digital versatile disk—DVD); (c) semiconductor media, like DRAM, SRAM, EPROM, EEPROM, a memory stick, or by any other media, like paper.

Optionally, memory 920 is distributed across different media. Portions of memory 920 can be removable or non-removable. For reading from media and for writing in media, computer 900 may use devices well known in the art such as, for example, disk drives or tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute embodiments of the invention, including steps of the disclosed methods of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above-noted support modules (e.g., a compiler, an interpreter, and/or an operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 may be conveniently inserted into input device 940. Carrier 970 may be implemented as any computer readable medium, such as a medium largely explained above (cf. memory 920). Generally, carrier 970 is an article of manufacture comprising a computer readable medium having computer readable program code means embodied therein for executing embodiments of the invention, such as the methods of the present invention disclosed herein. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody a computer program product (CPP) 101/102 to be executed by processor 911/912 (not shown) in computers 901/902, respectively.

Input device 940 symbolizes a device that provides data and instructions for processing by computer 900. For example, device 940 may comprise a keyboard, a pointing device (e.g., a mouse, a trackball, cursor direction keys), a microphone, a joystick, a game pad, a scanner, and/or a disk drive. Although the examples are devices with human interaction, device 940 can also operate without human interaction, such as, a wireless receiver (e.g., with a satellite dish or terrestrial antenna), a sensor (e.g., a thermometer) and/or a counter (e.g., goods counter in a factory). Input device 940 can also serve to read carrier 970.

Output device 950 symbolizes a device that presents instructions and data that have been processed. For example, a monitor or a display, a cathode ray tube (CRT), a flat panel display, a liquid crystal display (LCD), a speaker, a printer, a plotter, and/or a vibration alert device. Similar as above, output device 950 communicates with the user, but it can also communicate with further computers.

Input device 940 and output device 950 can be combined into a single device, and either device 940 or 950 can be provided optionally.

Bus 930 and network 990 provide logical and physical connections by conveying instruction and data signals. While connections inside computer 900 are conveniently referred to as "bus 930", connections between computers 900-902 are referred to as "network 990". Optionally, network 990 comprises gateways comprising computers that specialize in data transmission and protocol conversion.

Devices 940 and 950 may be coupled to computer 900 by bus 930 (as illustrated) or by network 990 (optional). While the signals inside computer 900 are mostly electrical signals, the signals in network may be electrical, magnetic, optical or wireless (radio) signals.

Networking environments (such as network 990) are commonplace in offices, enterprise-wide computer networks, intranets and the Internet (i.e., the World Wide Web). The physical distance between a remote computer and computer 900 is not important. Network 990 can be a wired or a wireless network. To name a few network implementations, network 990 may be, for example, a local area network (LAN), a wide area network (WAN), a public switched telephone network (PSTN), an Integrated Services Digital Network (ISDN), an infra-red (IR) link, a radio link, like Universal Mobile Telecommunications System (UMTS), Global System for Mobile Communication (GSM), Code Division Multiple Access (CDMA), or a satellite link.

Transmission protocols and data formats are known such as, for example, transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computers and programs are closely related. As used hereinafter, phrases, such as "the computer provides" and "the program provides", are convenient abbreviations to express actions by a computer that is controlled by a program.

DETAILED DESCRIPTION

Figure 2:
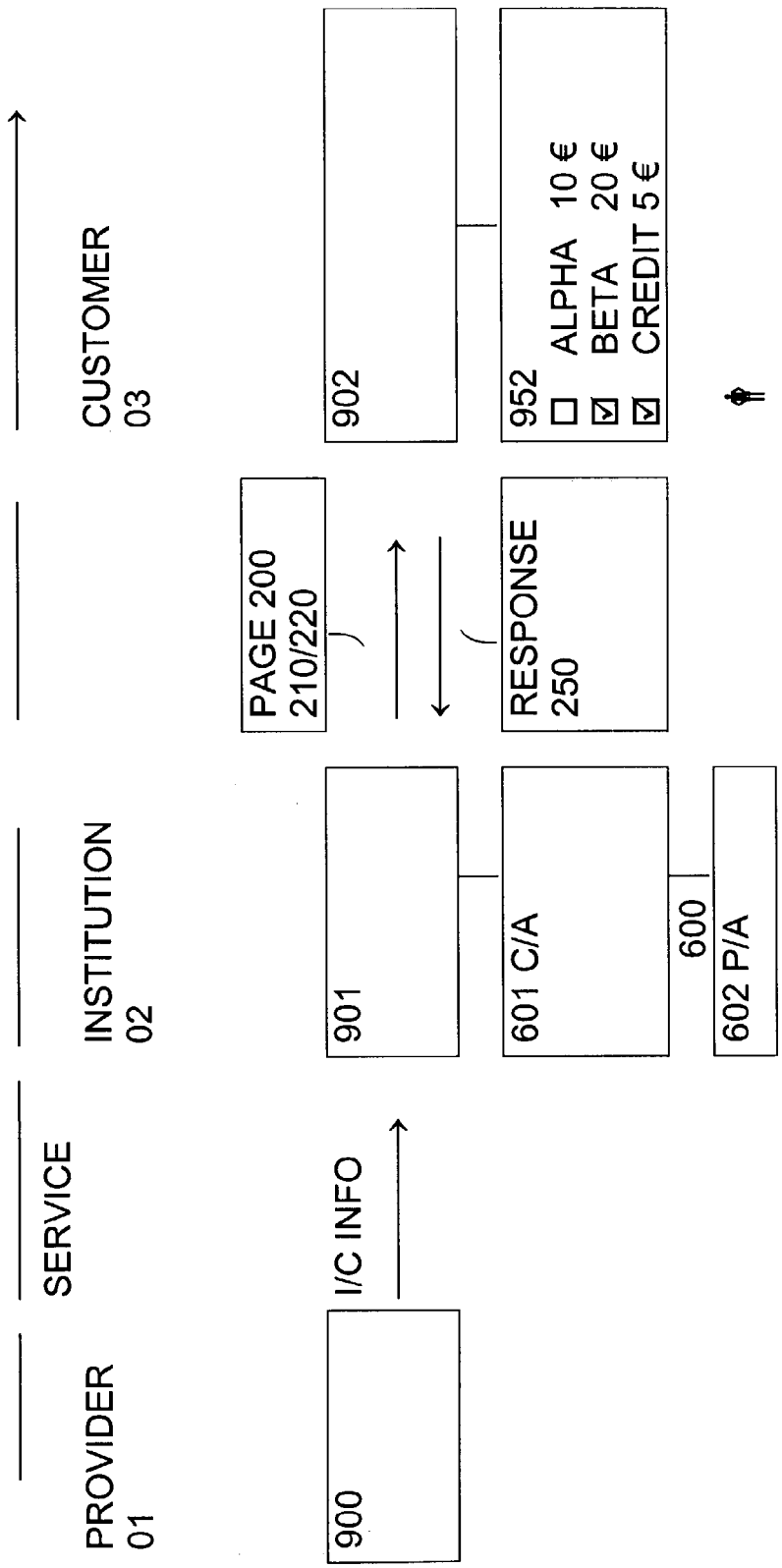
FIG. 2 illustrates an overview of an exemplary system environment for preparing an electronic financial transaction.

FIG. 2 illustrates an overview of an exemplary system environment for implementing embodiments of the invention. For convenience of explanation, the following conventions are made: provider 01 is an organization that provides service to customer 03 (e.g., an energy supplier supplying electricity to a private household); customer 03 is (a) a person or (b) an organization that receives the service. Account institution 02 is an organization that arranges payment for the service (from customer 03 to provider 01). The user is a person (a) being the customer or (b) being associated with the customer.

The computers of FIG. 1 are conveniently classified into provider computer 900, account computer 901 and customer computer 902. This classification is convenient for explanation; computers 900 and 901 can be combined as well; or computer functions can be distributed to further computers.

Initially, provider computer 900 forwards invoice and credit information (I/C INFO) to account computer 901.

Performing a first server/client method of the present invention, account computer 901 sends page 200 to customer computer 902 and thereby forwards I/C information in first portion 210 (of page 200) and forwards calculation instructions in second portion 220;

customer computer 902 uses a browser to interpret portion 210 (of page 200) to present different invoice items (e.g., "ALPHA 10 €", "BETA 20 €") and credit items ("CREDIT 5 Euro") on screen 952;

the user (at computer 902) selects at least one invoice item (e.g., "BETA 20 €") and at least one credit item (e.g., "CREDIT 5 €");

the browser uses the instructions in portion 220 (of page 200) to calculate a payment amount (P, e.g., 15 € being the offset between the selected invoice item BETA and the selected credit item CREDIT); and customer computer 902 returns response 250 with the payment amount (P, e.g., "15 €") to account computer 901.

Transaction 600 has now been prepared according to a first method (cf. FIG. 3, 400) of the present invention, so that account computer 901 performs transaction 600 by deducting P (e.g. 15 €) from customer account 601 (C/A) and adding P to provider account 602 (P/A).

Alternatively, the browser uses the instructions in portion 220 (of page 200) to include a selection representation into response 250. The selection representation indicates the selected invoice item (e.g., BETA) and the selected credit item (e.g., CREDIT). Calculating P is shifted to account computer 901.

FIG. 2 is also convenient to illustrate other conventions, as further described below.

An invoice list (IL) is a statement that is made available by provider 01 to customer 03. The invoice list may list invoice items (e.g., "ALPHA 10 €", "BETA 20 €"). In FIG. 2, the invoice list is illustrated as presented to the user (on screen 952). An invoice item generally is a representation of at least a particular service together with a corresponding monetary amount (e.g., service ALPHA and amount 10 €). The invoice item number (M) stands for the number of items on the invoice list (FIG. 2: M=2).

A credit list is a statement that is made available by provider 01 to customer 03 and that lists credit items. A credit item is a representation of a monetary amount that the provider credits to the customer for a particular action (e.g., 5 € for overpayment). The credit item number (N) is the number of items on the credit list (FIG. 2: N=1).

An invoice/credit list is a combination of invoice and credit lists for simultaneous presentation to the user (cf. screen 952 of FIG. 2). Euro (€) is the exemplary currency used for explanation herein. Cents are conveniently not illustrated but can be added by those of skill in the art.

The sum invoice amount (ΣI) is the sum of the invoice amounts (I) to be paid, independent of selection (e.g., 10 €+20 €=30 €). It is an advantage that the user selection determines which items are to be paid by transaction 600.

Likewise, the sum credit amount (ΣC) is the sum amount of all credit items (e.g., 5 €). The credit amount (C) is the amount of the selected credit items. The advantage applies likewise.

A selector is an interactive screen element presented by customer computer 902 to the user. FIG. 2 symbolizes selectors by check boxes. Persons of skill in the art can implement the selectors otherwise, such as by radio buttons, input fields, or by keys. In FIG. 2, there are 2 invoice selectors for selecting an invoice item (e.g., only BETA selected) and a credit selector for selecting credit item (e.g., CREDIT 5 € selected).

The term browser-page stands for any document with browser readable language (e.g., markup language or script language such as HTML, XML, Java, or JavaScript). The term browser presentation collectively stands for lists, amount indicators, selectors and/or the like that the browser displays on screen 952 to the user based on page 200 with portions 210/220.

Figure 3:
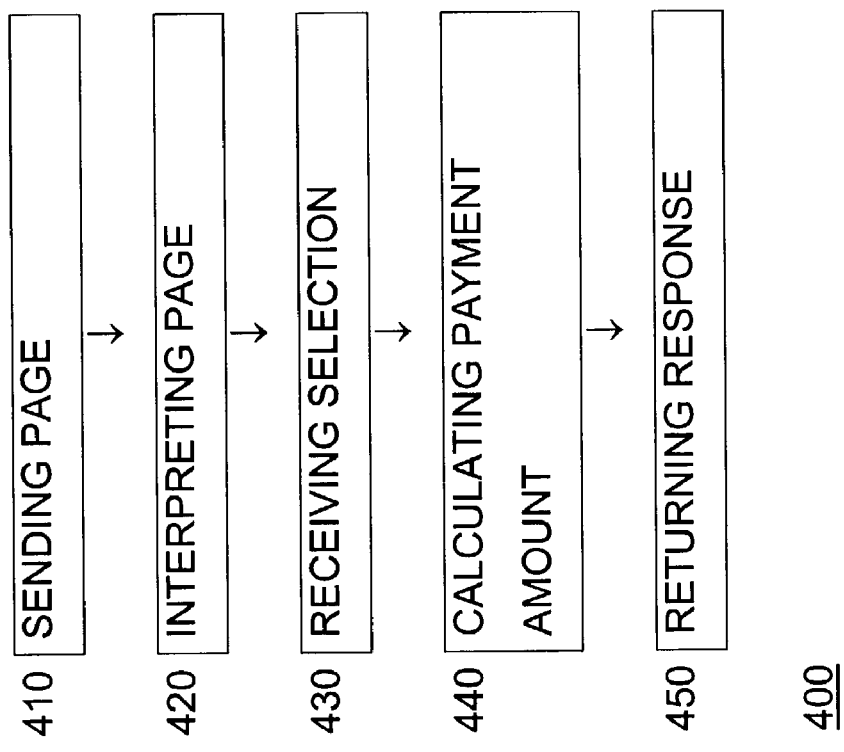
FIG. 3 illustrates a simplified flowchart diagram of a first method for preparing an electronic financial transaction.

FIG. 3 illustrates a simplified flow chart diagram of an exemplary method 400 of the present invention. Method 400 is a method for preparing an electronic financial transaction, wherein prior to preparing the transaction, first computer 900 of provider 01 forwards invoice and credit (I/C) information to second computer 901 of account institution 02, and wherein after preparing, second computer 901 performs the transaction by deducting a payment amount (P) from customer account 601 and adding the payment amount (P) to provider account 602. In the exemplary method, the step of preparing may comprise:

sending 410 page 200 to third computer 902 to forward invoice and credit information in first portion 210 of the page 200 and to forward calculation instructions in second portion 220 of page 200;

interpreting 420 first portion 210 with a browser of third computer 902 to present different invoice items and credit items on screen 952;

receiving 430 from the user of third computer 902 a selection of at least one invoice item and of at least one credit item;

calculating 440 the payment amount (P) by offsetting the amounts of the invoice and credit items, thereby using the instructions in second portion 220; and returning 450 response 250 with the payment amount (P) to second computer 901.

Figure 4:
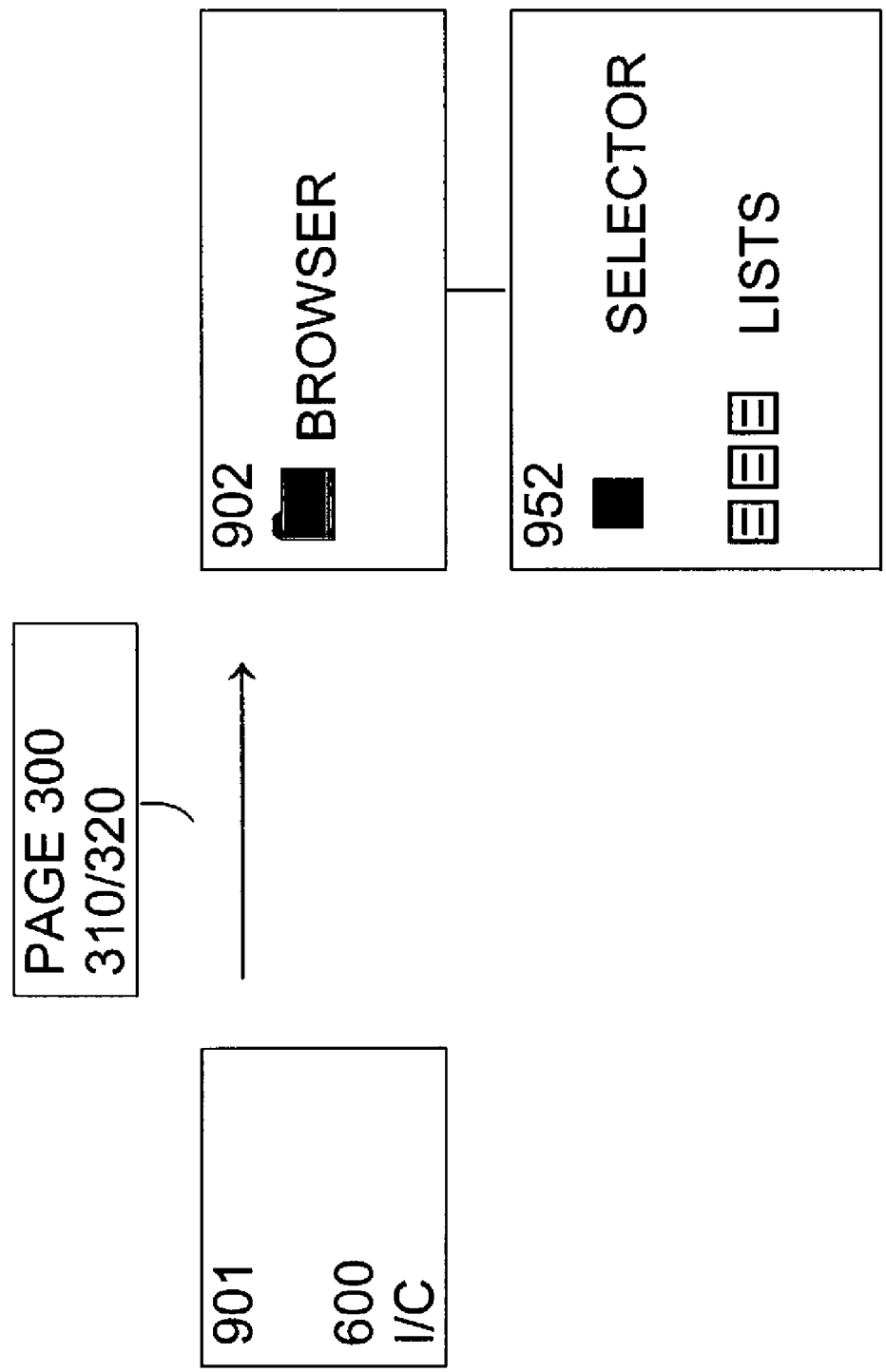
FIG. 4 illustrates an overview of an exemplary system environment for presenting results of the electronic financial transaction.

FIG. 4 illustrates an overview of an exemplary system environment for presenting results of the electronic financial transaction. Illustrated are account computer 901 (transaction 600, I/C), customer computer 902, page 300 with first portion 310 (representations of monetary amounts) and second portion 320 (instructions), as well as screen 952 with selector and lists.

Figure 5:
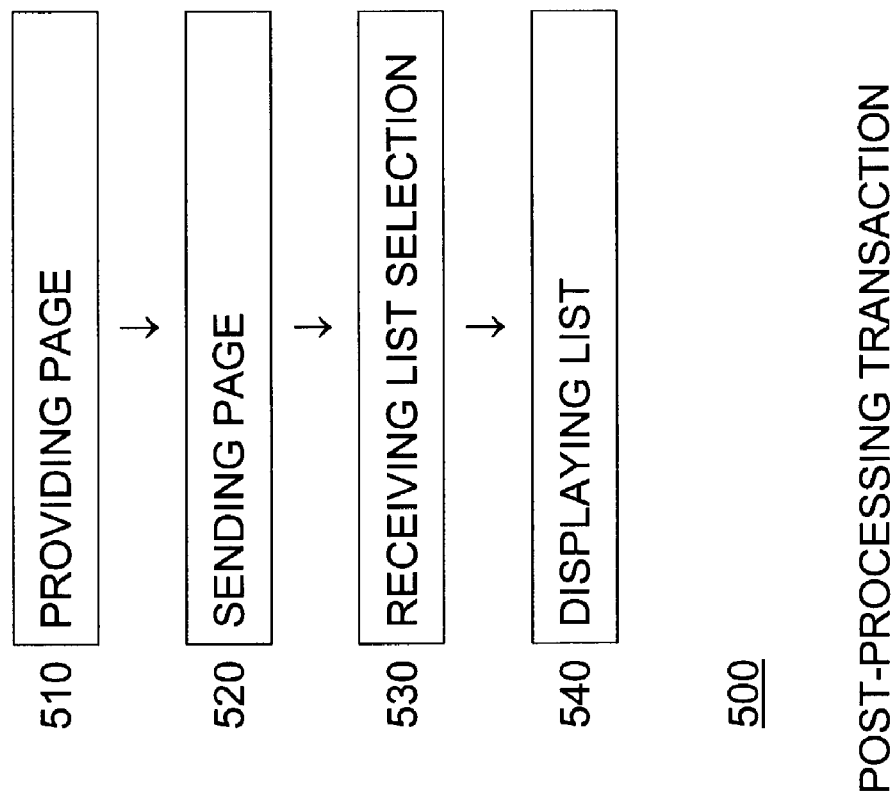
FIG. 5 illustrates a simplified flowchart diagram of a second method for processing data from the electronic financial transaction to present results.

FIG. 5 illustrates a simplified flowchart diagram of an exemplary method 500 for processing data from electronic financial transaction (600) with invoice items (I) and credit items (C). In other words, the exemplary method relates to a post-processing transaction 600.

In accordance with the exemplary method, computer 901 performs the following steps: providing 510 page 300 (cf. FIG. 4) with a plurality of representations of monetary amounts relating to the invoice items and credit items (portion 310) and with instructions (portion 320); and sending 520 page 300 to computer 902.

Computer 902 interprets the instructions with a browser to perform the following steps: receiving 530 a list selection from the user; and, according to the selection, displaying 540 a list with invoice items and credit items.

Figure 7:
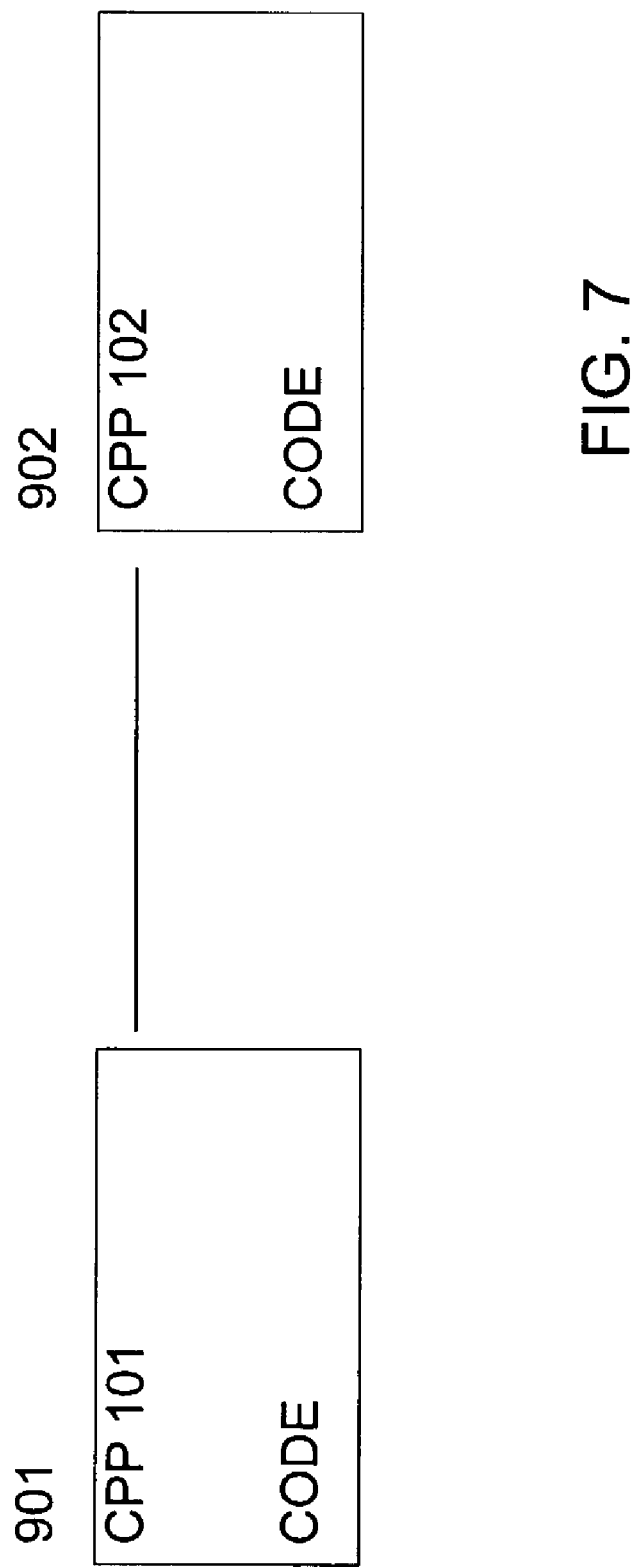
FIG. 7 illustrates exemplary computers and program code.
Figure 9:
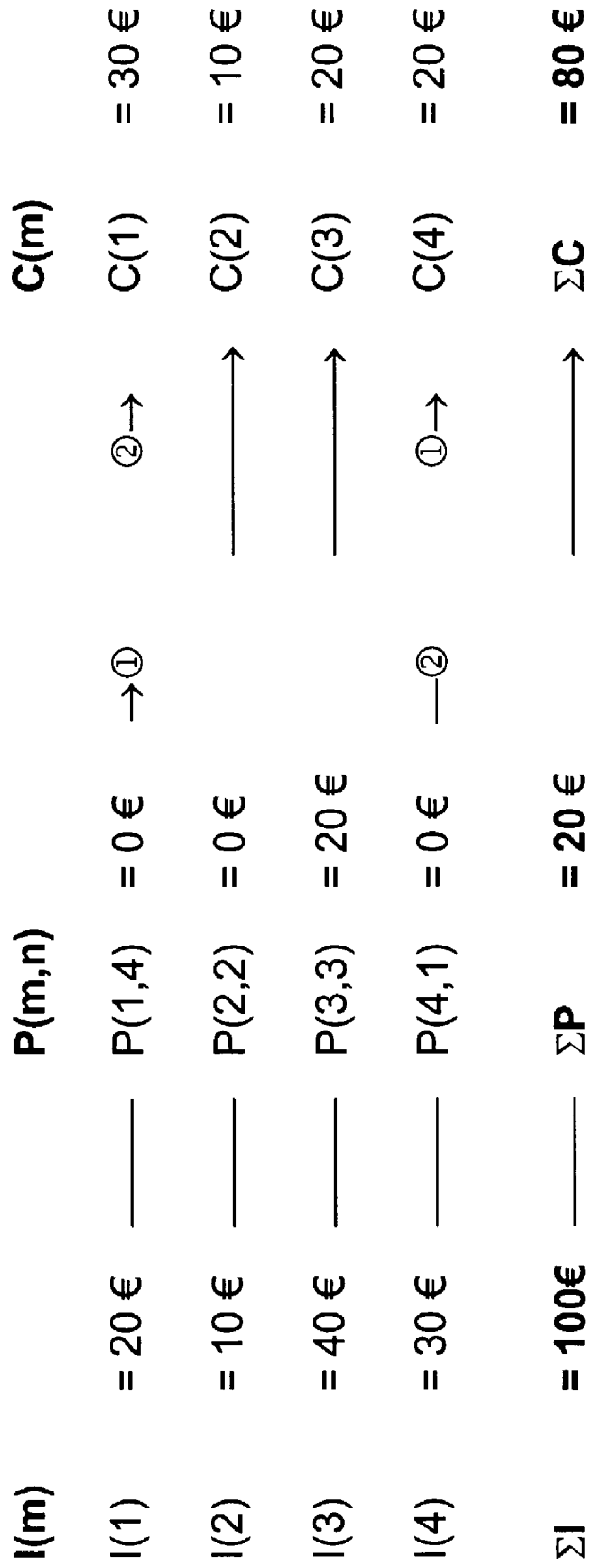
FIG. 9 illustrates an exemplary overview of the assignment in a variation.

The following optional features are useful alone or in combination:

List Feature: presentation of different lists (L) on screen 952 of computer 902 (cf. FIGS. 11-23);

Modification Feature: modification of invoice amounts (I) and credit amounts (C): from entry (E) amount to modified (M) amount by delta (D) amount (cf. FIGS. 11-23);

Multiple Instrument Feature: payment of single items by charging multiple payment instruments, payment instrument being any means for paying (e.g., credit card, bank account, cash card, prepaid card), such as BANK X or BANK Y (cf. FIGS. 12-16);

Business Rule Feature: calculation of payment amount under consideration of credit amount, interest and the like, calculation at computer 902 or computer 901 (cf. FIG. 7);

Consecutive Transaction Feature: invoice or credit items with states such as open (O) and residual (R) (cf FIG. 6, cf. FIGS. 11-23); and Invoice-to-Credit Assignment Feature (FIGS. 8-9).

Letters in parenthesis are conveniently combined to form acronyms (e.g., E and I to EI). There is no need to display these acronyms or letters to the user. In other words, the acronyms in the FIGS. are only provided for convenience of understanding.

FIG. 6 illustrates an exemplary classification for monetary amounts. As indicated in the columns of FIG. 6, amounts may be classified into amount types:

invoice amount (I): the amount that provider 01 charges to customer 03, credit amount (C): the amount that provider 01 credits to customer 03, and payment amount (P): the amount that is actually paid by customer 03 during the transaction.

Provider 01 communicates I and C (i.e., I/C information) to account institution 02, and account institution 02 communicates I and C to customer 03. Customer 03 communicates P to account institution 02 for payment to provider 01 during the transaction. In terms of computers 900-902, I and C may be part of page 200/300, and—implicit or explicit—P may be part of response 250 (optionally of page 300). Other arrangements are also possible, consistent with the embodiments of the present invention.

Wherever possible, the explanations herein conveniently refer to positive amounts. However, it is within the scope of the present invention that amounts can be negative as well.

As indicated by the rows of FIG. 6, further classification follows some of the features:

Modification feature: entry amount (E) is the amount in I/C information of page 200 sent from computer 901 to computer 902 (e.g., 10 €, 20 € and 5 € for ALPHA, BETA, CREDIT, respectively). Modified amount (M) is the amount derived from E by user interaction in computer 902. Delta amount (D) is the arithmetic difference between entry amount E and modified amount M:

$$D = E - M.$$

E is also distinguished for I, C and P:

EI (entry invoice amount, e.g., 20 €for BETA),

EC (entry credit amount, 5 € as credit), and

EP (entry payment amount, e.g., EP=EI−EC), 15 € payment).

Modified amount (M) is also distinguished for I, C and P:

MI (modified invoice amount, e.g., user reduces EI=20 € to MI=18 €),

MC (modified credit amount, e.g., user limits credit spending from EC=5 € to MC=2 €), and MP (modified payment amount, e.g., MP=MI−MC=18 €−2 €=16 €).

Delta amount (D) is also distinguished for I, C and P:

DI=EI−MI (delta invoice amount),

DC=EC−MC (delta credit amount), and

DP=EP−MP (delta payment amount).

Delta amounts are calculated in computer 902 (e.g., by code in portion 220 of page 200) or in computer 901. The above definitions can be applied to derive a modified amount M from an entry amount E and a user-defined delta amount D. This is convenient for optional implementations where the user indicates D instead of M. For example, for given EI=20 €, the user indicates DI=2 €, and MI=18 € is calculated automatically.

In other words, D and M can be replaced. For convenience, the explanation refers to M only (cf. examples in response 250).

D and M are used to calculate residual amounts.

Still referring to FIG. 6, page 200 communicates M invoice items (e.g., FIG. 2, M=2, ALPHA, BETA), and N credit items (e.g., FIG. 2, N=1). Sum amounts may be defined as follows:

ΣI (sum invoice amount) as the sum of all I(m) with m=1 to M, and

ΣC (sum credit amount) as the sum of all C(n) with n=1 to N.

Response 250 communicates Q payment items. A sum payment amount may be defined as:

ΣP as the sum of all P(q) with q=1 to Q.

For symmetric payment assignment, M, N and Q are equal. For asymmetric payment assignment, M, N and Q are not necessarily equal. The number Q of payments is determined by a number of (m,n) pairs. Details are explained in connection with FIGS. 8-9.

Still referring to FIG. 6, for the consecutive transaction feature, the following is defined: In repetitions of method 400, transaction 600, and method 500, entry amounts (E) are split into portions for consecutive transactions. For example, an invoice amount (I) is open (O) ("unpaid") as long as a first transaction is not yet completed. When the first transaction serves only a fraction of I, a residual (R) amount becomes the entry amount (E). For convenience, open and residual amounts are distinguished by superscript O and R. The distinction is made for I and C.

$E^O I$ (entry open invoice amount), the invoice amount in page 200 during the first execution of method 400 (e.g., $E^O I$=20 €, BETA).

$E^R I$ (entry residual invoice amount), the invoice amount in page 200 during the second execution of method 400 (e.g., $E^R I$=2 € if MI=18 €was initially paid, BETA).

$E^O C$ (entry open credit amount), the credit amount in page 200 during the first execution of method 400 (e.g., 5 €).

$E^R C$ (entry residual credit amount), the credit amount in page 200 during a second or further execution of method 400 (e.g., EC=3 €).

Preferably, the amount classification remains hidden from the user.

FIG. 7 illustrates an example of computers 901 and 902 with program code ("CODE") for executing methods 400 and 500. The code is part of CPP 101 and 102 in computers 901 and 902, respectively. Optionally, CPP 102 is communicated to computer 902 from computer 901, for example, in portion 220 of page 200. Java script, Java applets or other browser interpretable code is advantageously used in computer 902. Calculation steps, for example, to calculate P are performed either by computer 901 alone, by computer 902 alone, or by computers 901 and 902 in combination.

Business-rule feature: A business rule is any predefined rule for calculating P, for example, the one-to-one rule with P being the difference between invoice amount I and credit amount C.

This one-to-one rule can be applied to the classification of FIG. 6, for example:

ΣP=ΣI−ΣC (sum payment amount), and

P=I−C (any payment amount).

Further rules can be introduced:

discount calculation rule, e.g.,

P=E-DISCOUNT, time rule, e.g., DISCOUNT as a function of time, interest rule, consideration of accumulated interest over time, or deriving P from a modified amount (M).

A rule for calculating credit is, for example:

C=M−E (for details cf. FIGS. 11-23).

A rule for calculating modified amount is, for example:

M=E*95% or E*105 (pay 5% less or more depending on available credit).

Persons of skill in the art can introduce still further rules without departing from the scope of the invention.

FIGS. 8-9 illustrate exemplary overviews related to the invoice-to-credit assignment feature.

Generally, the user assigns invoice amounts I to credit amounts C. More specifically, the user may assign a number of M invoice amounts I(m) to a number of N credit amounts C(m). In the example, both numbers are equal: M=N.

The figures indicate each assignment by a separate arrow and by the payment amount (P(q) or P(m,n)) calculated, for example, according to P=I−C (one-to-one rule). The plurality of (m,n) indices form an assignment vector.

The button row indicates sum amounts ΣI, ΣP and ΣC. Both figures conveniently use the same exemplary amounts: 20 €, 10 €, 40 € and 30 € as I (invoice) and 30 €, 10 €, 20 € and 20 € as C (credit). In both cases, customer 03 has to pay ΣI=100 €. Using credits with ΣC=80 €, customer 03 pays only ΣP=20 €.

The assignments are classified into symmetric assignment with P(q) (FIG. 8) and asymmetric assignment with P(m,n) (FIG. 9).

For example in FIG. 8:

P(1)=−10 € is the amount to be paid for invoice item 1 (I(1)=20 €) by using credit item 1 (C(1)=30 €);

P(2)=0 € is the amount to be paid for invoice item 2 (I(2)=10 €) by using credit item 2 (C(2)=10 €);

P(3)=20 € is the amount to be paid for invoice item 3 (I(3)=40 €) by using credit item 3 (C(3)=20 €); and P(4)=10 € is the amount to be paid for invoice item 4 (I(4)=30 €) by using credit item 4 (C(4)=20 €).

The assignment vector is:

[(m,n)]=[(1,1), (2,2), (3,3), (4,4)], which may be simplified to:

[q]=[1, 2, 3, 4].

For example in FIG. 9:

P(1,4)=0 € is the amount to be paid for invoice item 1 (I(4)=20 €) by using credit item 4 (C(4)=20 €);

P(2,2)=0 € is the amount to be paid for invoice item 2 (I(2)=10 € by using credit item 2 (C(2)=10 €);

P(3,3)=20 € is the amount to be paid for invoice item 3 (I(3)=40 €) by using credit item 3 (C(3)=20 €); and P(4,1)=0 € is the amount to be paid for invoice item 4 (I(4)=30 €) by using credit item 1 (C(1)=30 €).

The assignment vector is:

[(m,n)]=[(1,4), (2,2), (3,3), (4,1)].

The assignment vector (e.g., either of FIG. 8 or 9) is conveniently communicated from computer 902 to computer 901 in response 250. Preferably, the assignment is determined through user interaction. The following description refers to FIG. 9 under the assumption that 4 screens with checkboxes are displayed one after the other. Optionally, amounts are displayed to the user next to the checkboxes.

Screen with check boxes for I(1), I(2), I(3), I(4), C(1), C(2), C(3) and C(4). The user selects I(1) and C(4). The first vector element is determined as (1,4).

Screen with remaining check boxes for I(2), I(3), I(4), C(1), C(2) and C(3). The user selects I(2) and C(2). The second vector element is determined as (2,2).

Screen with remaining check boxes for I(3), I(4), C(1), and C(3). The user selects I(3) and C(3). The third vector element is determined as (3,3).

Screen with remaining check boxes for I(4) and C(1). The user selects them. The fourth vector element is determined as (4,1).

Modifying the amount accordingly is optional (modification feature, E to M). For example, the screen could have input fields to invite the user to alter entry invoice amounts (EI) to modified invoice amounts (MI).

Figure 10:
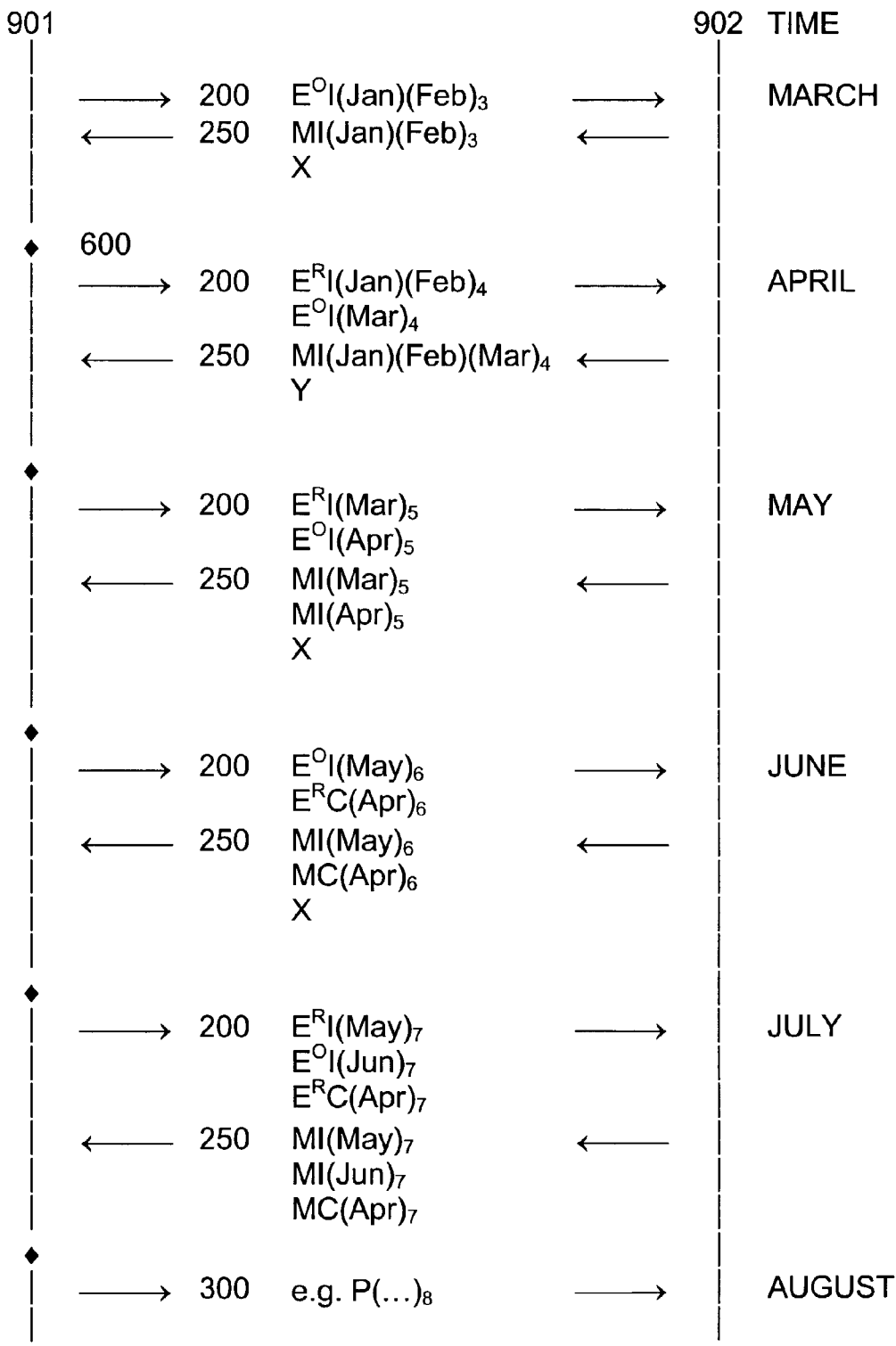
FIG. 10 illustrates an exemplary overview over consecutive executions of the first method, the transaction, and the second method.

FIG. 10 illustrates an exemplary overview over consecutive executions of method 400, transaction 600, and method 500.

Vertical lines symbolize computers 901 and 902; a diamond symbolizes transaction 600 (on computer 901). Arrows indicate the following steps:

sending page 200 (method 400),
returning response 250 (method 400), and
sending page 300 (method 500).

MARCH, APRIL, MAY, JUNE, JULY, AUGUST and subscripts 3, 4, 5, 6, 7, 8, respectively, indicate consecutive time points of method execution.

Jan, Feb, Mar, Apr, May, Jun, Jul (or " . . . ") indicate services provided by provider 01 to customer 03. These 3-letter words appear on the list and also serve as indices (instead of m or n).

Page 200 has EI( . . . ) (entry invoice amounts) and EC( . . . ) (entry credit amounts) corresponding to the service (by provider 01). Both EI( . . . ) and EC( . . . ) can be open (O) or residual (R).

Response 250 has MI( . . . ) (modified invoice amounts) and MC( . . . ) (modified credit amounts).

Page 300 has amounts to be presented, such as payments amounts P( . . . ).

It is assumed that provider 01 has already forwarded I/C to account institution 02 for January and February services to customer 03. Method 500 can be executed at any time point; the illustration at AUGUST is a convenient example.

While pages 200, 300 and response 250 remain hidden from the user, corresponding example for screen 952 of computer 902 at time points MARCH to AUGUST are illustrated in the following figures.

Figure 11:
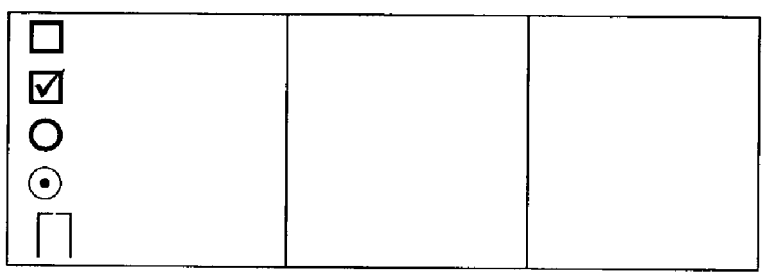
FIG. 11 illustrates conventions for further figures.
Figure 19:
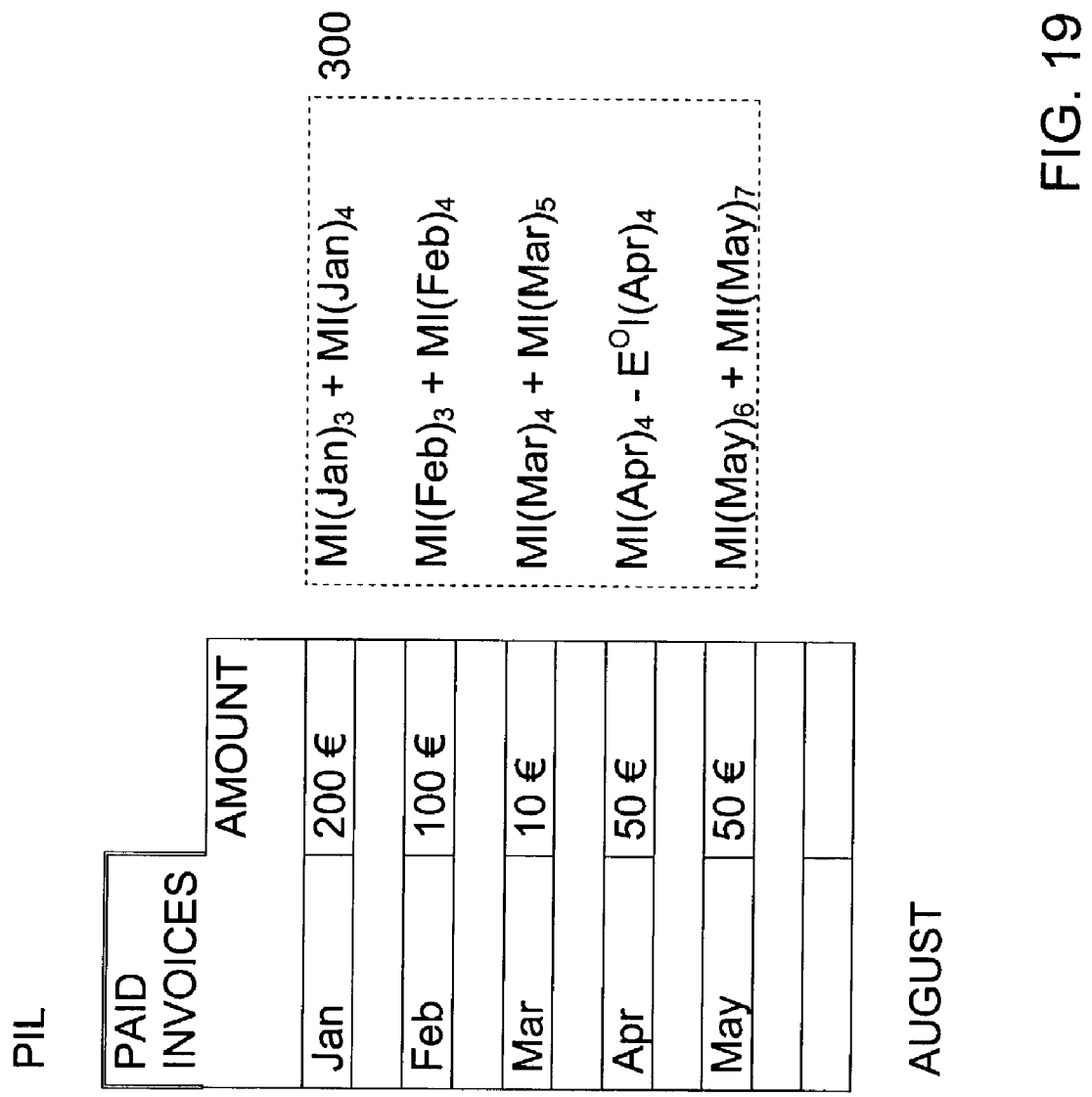

FIG. 11 provides illustration conventions for FIGS. 12-21.

Plain-line frames illustrate screen 952 as presented to the user with selectors and lists (L). The selectors are symbolized by a check box, by a radio button and by a register tab.

Dashed-line frames illustrate acronyms for content of page 200, response 250 or page 300, usually hidden from the user. The acronyms correspond to these in FIG. 10.

FIGS. 12-16 represent exemplary repetitions of method 400 from MARCH to JULY. Illustrated are (list feature):

EIL (entry invoice list),
ECL (entry credit list),
MIL (modified invoice list),
MCL (modified credit list), and
BL (bank list).

An EIL becomes a MIL when the user modifies at least one invoice amount. An ECL becomes a MCL when the user modifies at least one credit amount (modification feature). EIL and ECL are preferably presented simultaneously; MIL and MCL are also preferably presented simultaneously.

Optionally, items are automatically selected if the user modifies the amount of the item. The order in time of modifying (EI to MI, EC to MC) and of selecting is not important.

After modification/selection, P (payment amount) is calculated (business rule feature), and BL is presented to determine the preferred payment instrument (multiple instrument feature).

Although illustrated together, EIL/ECL, MIL/MCL and BL are conveniently presented to the user consecutively.

Texts are presented to assist the user, for example, by:
"Jan", "Feb" etc. to identify invoice or credit items,
"INVOICE" for an invoice list (EIL, MIL),
"CREDIT" for a credit list (ECL, MCL),
"Total to pay" for ΣEI minus ΣEC,
"Decided to pay" for ΣMI minus ΣMC, and
"BANK" for indicating the payment instrument, for example, BANK X or BANK Y.

Text is accompanied by amounts (EI, EC, MI, MC, Σ). Preferably, sum amounts and payment amounts for display on screen 952 are calculated by computer 902. (Amounts for transaction 600 are optionally calculated by computer 901.)

As indicated in the dashed frames, data from page 200 is:
EI(entry invoice amount), and
EC(entry credit amount).

Data going into response 250 is:
MI (modified invoice amount),
MC (modified credit amount), and
bank indicator X or Y.

FIG. 12 illustrates a MARCH time point. Customer 03 using BANK X partially pays for Jan and Feb services. In other words, customer 03 pays less than required.

lists: EIL, MIL, and BL.
entry invoice amount:

$E^O I(Jan)_3 = 200$ € (original)

$E^O I(Feb)_3 = 100$ € (original)

sum entry invoice amount ("Total to pay")

$$\Sigma EI_3 = 200 \text{ €} + 100 \text{ €}$$
$$= 300 \text{ €}$$

modified invoice amounts:

$MI(Jan)_3 = 130$ €

$MI(Feb)_3 = 90$ €

$\Sigma MI_3 = 130$ €$+90$ €$=220$ € delta amounts:

$$DI(Jan)_3 = EI(Jan) - MI(Jan)$$
$$= 200 \text{ €} - 130 \text{ €}$$
$$= 70 \text{ €}$$
$$DI(Feb)_3 = EI(Feb) - MI(Feb)$$
$$= 100 \text{ €} - 90 \text{ €}$$
$$= 10 \text{ €}$$
$$\Sigma DI_3 = \Sigma EI - \Sigma MI$$
$$= 300 \text{ €} - 220 \text{ €}$$
$$= 80 \text{ €}$$

business rule: one-to-one $$\Sigma P_3 = \Sigma MI_3$$
$$= 220 \text{ €}$$

Bank selection: X

FIG. 13 illustrates a APRIL time point. Using BANK Y, customer 03 completely pays the residual amounts for Jan and Feb services, partially pays for Mar service. Again, customer 03 pays less than required.

lists: EIL, MIL and BL
entry invoice amount:
$E^R I(Jan)_4 = 70$ €(residual, $E^R I(Jan)_4 = DI(Jan)_3$)
$E^R I(Feb)_4 = 10$ €(residual, $E^R I(Feb)_4 = DI(Feb)_3$)
$E^O I(Mar)_4 = 80$ €(original)

$$\Sigma EI_4 = E^R I(Jan)_4 + E^R I(Feb)_4 + E^O I(Mar)_4$$
$$= 70 \text{ €} + 10 \text{ €} + 80 \text{ €}$$
$$= 160 \text{ €}$$

modified invoice amount:
$MI(Jan)_4 = 70$ €
$MI(Feb)_4 = 10$ €
$MI(Mar)_4 = 70$ €
business rule: one-to-one $$P_4 = \Sigma MI_4$$
$$= 150 \text{ €}$$

Bank selection: Y

FIG. 14 illustrates a MAY time point. Using BANK X, customer 03 completely pays the residual amount for Mar service and overpays for Apr service.

lists: EIL, MIL and BL
entry invoice amounts:
$E^R I(Mar)_5 = 10$ €(residual, $E^R I(Mar)_5 = DI(Mar)_4$)
$E^O I(Apr)_5 = 50$ €(open)

$$\Sigma EI_5 = 10 \text{ €} + 50 \text{ €}$$
$$= 60 \text{ €}$$

modified invoice amounts:
$MI(Mar)_5 = 10$ €
$MI(Apr)_5 = 90$ € (i.e. 40 € more than required)
$\Sigma MI_5 = 10 \text{ €} + 90 \text{ €} = 100 \text{ €}$
business rule: one-to-one $$\Sigma P_5 = \Sigma MI_5$$
$$= 100 \text{ €}$$

bank selection: X

FIG. 15 illustrates a JUNE time point. Using BANK X and credit from overpayment (Apr service), customer 03 partially pays for May service. Customer 03 pays less than required.

lists: EIL/ECL, MIL/MCL, BL
entry invoice amount (in EIL):
$E^O I(May)_6 = 50$ €(original)
entry credit amount (in ECL):
$E^O C(Apr)_6 = 40$ €(original, $MI(Apr)_5 - EI(Apr)_5$)
modified invoice amount (in MIL):
$MI(May)_6 = 40$ €
modified credit amount (in MCL):
$MC(Apr)_6 = 10$ €(i.e. not using 30 €)
business rule: one-to-one $$\Sigma P_6 = \Sigma MI_6 - \Sigma MC_6$$
$$= MI(May)_6 - MC(Apr)_6$$
$$= 30 \text{ €}$$

Bank selection: X

FIG. 16 illustrates a JULY time point. Still using credit from overpayment (Apr service), customer 03 completely pays the residual for May service and partially pays for Jun service. Customer 03 pays less than required.

lists: EIL/ECL, MIL/MCL
entry invoice amount (in EIL):
$E^R I(May)_7 = 10$ €(residual)
$E^O I(Jun)_7 = 40$ €(original)
entry credit amount (in ECL):
$E^R C(Apr)_7 = 30$ €(residual, $E^O C(Apr)_6 - MC(Apr)_6 = 40$ €–10 E)
modified invoice amount (in MIL):
$MI(May)_7 = 10$ €(unchanged)
$MI(Jun)_7 = 20$ €(reduced from 40 €)
modified credit amount (in MCL):
$MC(Apr)_7 = 10$ €(unchanged, i.e. using the credit completely)
business rule: one-to-one $$\Sigma P_7 = \Sigma MI_7 - \Sigma MC_7$$
$$= MI(May)_7 + MI(Jun)_7 - MC(Apr)_7$$
$$= 10 \text{ €} + 20 \text{ €} - 30 \text{ €}$$
$$= 0 \text{ €}.$$

FIGS. 17-23 illustrate an exemplary execution of method 500 in AUGUST.

FIG. 17 illustrates a list selector, for example, register cards with tab for invoice items, credit items, or payment overviews. The user is invited to select any list (cf. step 530 receiving list selection) for example:
OPEN INVOICES (cf. FIG. 18)
PAID INVOICES (cf. FIG. 19)
USED CREDITS (cf. FIG. 20)
OPEN CREDITS (cf. FIG. 21)
PAYMENTS PER ITEM (cf. FIG. 22)
PAYMENTS PER PAY DATE (cf. FIG. 23)

Information needed to provide the lists are forwarded in page 300 (step sending page) from computer 901 to computer 902. As in step 540, the lists are displayed as follows.

FIG. 18 illustrates OIL (open invoice list) listing invoice items for that payment by customer 03 is outstanding ("My Open Bills"):

$E^R I(Jun)_8$ (payment for Jun as residual $E^O I(Jun)_7 - MI(Jun)_7$).

FIG. 18 illustrates PIL (paid invoice list) listing invoice items for that customer 03 has already paid. For services Jan to May:

$MI(Jan)_3 + MI(Jan)_4$
$MI(Feb)_3 + MI(Feb)_4$
$MI(Mar)_4 + MI(Mar)_5$
$MI(Apr)_5 - credit$
$MI(May)_6 + MI(May)_7$ The amount for unpaid service Jun is not illustrated.

FIG. 20 illustrates used CL (credit list) listing credit items that customer 03 has acquired and used. In the example, credit was calculated as:

$$ERC(Apr)_6 = MI(Apr)_5 - E^O I(Apr)_5$$
$$= 90\ \text{€} - 50\ \text{€}$$
$$= 40\ \text{€}$$

Credit usage was distributed to:

$MC(Apr)_6 = 10$ €(JUNE) for service May (cf. FIG. 15), $MC(Apr)_7 = 10$ €+20 €for service May and June, (cf. FIG. 16).

FIG. 21 illustrates open credits, i.e. credits that are still available. In the example, all credit was used.

Convenient is the indication of:
the origin of the credit (e.g., overpayment for a certain service),
C (credit amount), and
possible usage (conveniently also in combination with a graphical assignment as in FIGS. 8-9).

FIG. 22 illustrates an overview about payments made between MARCH and JULY. Columns indicate:
service by provider 01 (e.g., Jan to Jun),
pay status (Yes=I completely paid),
pay date (e.g., months MARCH to JULY),
BANK as payment instrument (X, Y and also CREDIT), and
amount that was paid (i.e., MI).

Convenient is an indication of credit generation (Apr in MAY) and credit spending (May/Jun in JUNE/JULY). Optionally, sorting schemes are provided so that the user can, for example, sort the overview according to pay date (e.g., ascending from MARCH), BANK, amounts (e.g., starting with the largest) or the like.

FIG. 23 illustrates an overview about payments organized according to pay date from MARCH to JULY. In other words, the figure informs about transactions 600 that have followed method 400.

Based on substantially the same data as for FIG. 22, the figures indicates also optionally indicates items, bank, amount per item, and sum amounts.

Persons of skill in the art can introduce various modifications to FIGS. 18-23. From the great variety of modifications, only some can be named here, for example:
splitting into partial amounts (e.g., PIL in FIG. 18, separately display $MI(Jan)_3$ and $MI(Jan)_4$);
indicating transaction dates (e.g., writing MARCH and APRIL);
introducing warnings to unpaid items;
having a list of residual invoice and credit items;
calculating credit amounts during selection so that the user sees potential benefits;
calculating P in computer 902 in parallel to computer 901 to inform the user;
displaying due dates, calendar dates by that provider 01 expects completion of transaction 600;
displaying available dates, calendar dates from that provider 01 provides credit in the future;
simulating bank statements, for example, listing the transactions, e.g., from BANK X (MARCH, MAY) and BANK Y (APRIL); and
searching items according to predefined criteria, such as status (e.g., transaction completed/"processed"), payment instrument (e.g., BANK X or Y), time period (e.g., last 12 months).

For such extra functionality, persons of skill in the art can add action control buttons or other browser control means.

It is an advantage that commercially available browser can be used in computer 902; in other words, extra software on computer 902 is not required.

REFERENCES

Σ sum
(m,n) invoice-to-credit assignment
€ Euro
01 provider
02 account institution
03 customer
10x computer program product
200, 300 page
210, 310 first portion
220, 320 second portion
250 response
400, 4xx method for preparing
500, 5xx method for processing
600 transaction
601 customer account (C/A)
602 provider account (P/A)
900 provider computer
901 account computer
902 customer computer
952 screen
9xx computer components
B, X, Y bank
C, n, N credit, index and number
E entry
I, m, M invoice, index, number
L, list
M, modified
O, open
P, q, Q payment, index and number
R, residual

The invention claimed is:

1. A method for preparing an electronic financial transaction, wherein prior to preparing the transaction, a first computer of a provider forwards invoice and credit information to a second computer of an account institution, and wherein after preparing, the second computer performs the transaction by deducting a payment amount from a customer account of a customer and adding the payment amount to a provider account, the method of preparing comprising:

receiving a page at a third computer, the page including invoice and credit information in a first portion of the page and calculation instructions in a second portion of the page, wherein the invoice and credit information is included in an invoice statement comprising a plurality of invoice items including paid invoice items and open invoice items, a plurality of credit items including open credit items and used credit items, representations of monetary amounts relating to the open invoice items and open credit items, and payment dates associated with the representations of monetary amounts;

interpreting the first portion by a browser of the third computer to present the invoice items and credit items on a screen;

receiving from a user of the third computer a first selection of at least one open invoice item and a second selection of at least one open credit item selected from the invoice statement, the open credit item indicating an amount being credited by the provider to the customer;

determining a modified invoice amount by adjusting a representation of monetary amount for the selected open invoice item, wherein the modified invoice amount is less than the representation of monetary amount for the selected open invoice item when a sum of the representation of monetary amounts for the open credit items is above a threshold value, and wherein the modified invoice amount is greater than the representation of monetary amount for the selected open invoice item when the sum of the representations of monetary amounts for the open credit items is below a threshold value;

calculating, using the third computer, the payment amount by offsetting the amounts of the modified invoice item and the selected open credit item based on the first selection, the second selection, the instructions in the second portion, and an assignment vector generated to assign the selected open credit item to the modified invoice amount; and returning a response with the payment amount to the second computer.

2. The method of claim 1, wherein calculating comprises evaluating the payment amount under consideration of an available date of at least one credit item.

3. The method of claim 1, wherein the first portion and the second portion of the page comprises a markup language.

4. The method of claim 1, wherein the second portion of the page comprises a client/browser interpretable language.

5. The method of claim 4, wherein the language comprises JavaScript code.

6. The method of claim 1, wherein receiving a selection comprises receiving a modification of at least one item selected from the credit items.

7. The method of claim 6, wherein calculating the payment amount comprises offsetting modified amounts.

8. The method of claim 1, wherein receiving the selection comprises receiving an invoice-to-credit-assignment.

9. The method of claim 8, wherein returning the response comprises returning the assignment vector.

10. The method of claim 1, wherein receiving the selection comprises receiving a selection of a payment instrument.

11. The method of claim 1, wherein calculating comprises calculating a credit as the difference between the modified invoice amount and an entry invoice amount, wherein the credit is communicated in a page during further execution of the method.

12. A computer program product tangibly embodied in a computer-readable storage medium, the storage medium comprising instructions which when executed on one or more computer processors cause the one or more computer processors to execute the method according to any one of claims 1-11.

13. A computer system for preparing an electronic financial transaction, the system comprising a first computer of a provider, a second computer of an account institution, and a third computer of a customer operated by a user, wherein the first computer, prior to the preparation of the transaction, forwards invoice and credit information to the second computer, and wherein, after preparation of the transaction, the second computer performs the transaction by deducting a payment amount from a customer account of a customer and adding the payment amount to a provider account, the system further comprising:

means for receiving a page at the third computer, the page including invoice and credit information in a first portion of the page and calculation instructions in a second portion of the page, wherein the invoice and credit information is included in an invoice statement comprising a plurality of invoice items including paid invoice items and open invoice items, a plurality of credit items including open credit items and used credit items, representations of monetary amounts relating to the open invoice items and open credit items, and payment dates associated with the representations of monetary amounts;

means for interpreting the first portion with the third computer to present the invoice items and credit items on a screen;

means for receiving from a user of the third computer a first selection of at least one open invoice item and a second selection of at least one open credit item selected from the invoice statement, the open credit item indicating an amount being credited by the provider to the customer;

means for determining a modified invoice amount by adjusting a representation of monetary amount for the selected open invoice item, wherein the modified invoice amount is less than the representation of monetary amount for the selected open invoice item when a sum of the representation of monetary amounts for the open credit items is above a threshold value, and wherein the modified invoice amount is greater than the representation of monetary amount for the selected open invoice item when the sum of the representations of monetary amounts for the open credit items is below a threshold value;

means for calculating, using the third computer, the payment amount by offsetting the amounts of the modified invoice item and the selected open credit item based on the first selection, the second selection, the instructions in the second portion, and an assignment vector generated to assign the selected open credit item to the modified invoice amount; and means for returning a response with the payment amount to the second computer.

14. The computer system of claim 13, further comprising means for sending the page from the second computer to the third computer.

15. The computer system of claim 13, wherein the first portion and the second portion of the page comprises a markup language.

16. The computer system of claim 13, wherein the means for interpreting the first portion of the page comprises a browser of the third computer.

17. The computer system of claim 13, wherein the means for receiving a selection comprises means for receiving a modification of at least one item selected from the credit items.

18. The computer system of claim 17, wherein the means for calculating comprises means for offsetting modified amounts.

19. The computer system of claim 13, wherein the means for receiving the selection comprises means for receiving an invoice-to-credit-assignment, and wherein the means for returning the response comprises means for returning the assignment vector.

20. The computer system of claim 13, wherein the means for calculating comprises means for calculating a credit as the difference between the modified invoice amount and an entry invoice amount.

* * * * *